United States Patent [19]

Alperin

[11] 4,332,529

[45] Jun. 1, 1982

[54] JET DIFFUSER EJECTOR

[76] Inventor: Morton Alperin, 6000 Lockhurst Dr., Woodland Hills, Calif. 91364

[21] Appl. No.: 116,649

[22] Filed: Jan. 28, 1980

Related U.S. Application Data

[63] Continuation of Ser. No. 603,361, Aug. 11, 1975, abandoned.

[51] Int. Cl.³ .......................... F04F 5/16; F04F 5/44
[52] U.S. Cl. ...................................... 417/54; 60/269; 417/167; 417/177; 417/179; 417/196; 417/198
[58] Field of Search .............. 417/151, 163, 167, 169, 417/170, 177, 179, 196–198, 54; 60/269; 239/265.17

[56] References Cited

U.S. PATENT DOCUMENTS

| | | | |
|---|---|---|---|
| 628,187 | 7/1899 | Sibley | 417/197 |
| 1,362,997 | 12/1920 | Koleroff | 60/269 |
| 1,495,185 | 5/1924 | Kirgan | 417/177 X |
| 1,687,550 | 10/1928 | Ehret | 417/54 |
| 2,000,762 | 5/1935 | Kraft | 417/167 |
| 2,852,922 | 9/1958 | Neumann | 417/179 X |
| 2,920,448 | 1/1960 | Coanda | 60/269 X |
| 2,922,277 | 1/1960 | Bertin | 60/269 X |
| 3,525,474 | 8/1970 | Ohain et al. | 60/269 X |
| 3,659,962 | 5/1972 | Zink et al. | 417/198 X |
| 3,795,367 | 3/1974 | Mocarski | 60/269 X |

FOREIGN PATENT DOCUMENTS 1428249 12/1968 Fed. Rep. of Germany ...... 417/151

Primary Examiner—Carlton R. Croyle
Assistant Examiner—Edward Look
Attorney, Agent, or Firm—Edward J. DaRin

[57] ABSTRACT

A jet diffuser ejector constructed and defined for maximizing thrust augmentation with minimal length. The ejector is provided with primary injection nozzles arranged in a preselected spaced relationship with the inlet section of the ejector and at a preselected angle with respect to the normal to the thrust axis of the ejector. The ejector may include a diffusing section having upstream and downstream diffusing sections with a diffuser jet arranged intermediate the diffusing sections.

20 Claims, 5 Drawing Figures

JET DIFFUSER EJECTOR

CROSS REFERENCE TO RELATED APPLICATIONS

This is a continuation of application Ser. No. 603,361 filed Aug. 11, 1975 now abandoned.

DISCLOSURE OF THE INVENTION

Basically, an ejector is a device which, upon receiving a flow of energized or pressurized fluid, gaseous or liquid, from a jet and mixes the energized fluid from its jet with the ambient fluid, and the mixture is caused to flow through the ejector shroud, thereby producing a net momentum increment such that the total exit momentum exceeds that of the momentum of the injected, energized fluid. A typical prior art device is illustrated in FIG. 1 of the present application.

Although devices of this general type have been known to function as thrust augmentors, the practical application of ejector thrust augmentation has been very limited, due primarily to the large size of the ejector required for satisfactory mixing and diffusion; processes which are essential to high thrust augmentation. One prior art device of this type is exemplified by the Coanda U.S. Pat. No. 3,261,162 granted on July 19, 1966. The Bertin U.S. Pat. No. 2,922,277 discloses the use of diffuser jets for a multiplicity of purposes.

The size of an ejector is governed by the requirement for mixing of injected and ambient fluid, and by the necessity for diffusion of the mixed flow in a divergent diffuser duct with large area ratio, i.e., the ratios $X_3/X_2$, as illustrated in FIG. 1. These processes normally require excessive length in the direction of the ejector's thrust axis and the present invention discloses several related techniques for reduction of the overall size of an ejector.

The present invention comprises an improved ejector which may be a rectangular ejector having primary and diffuser ejector jets and inlet/mixing and a diffuser section.

BRIEF DESCRIPTION OF THE DRAWINGS

These and other features of the present invention may be more fully appreciated when considered in the light of the following specification and drawings in which.

PRIMARY NOZZLES

The primary injector jets are supplied with pressurized fluid at an arbitrary pressure and temperature. This energized fluid is then accelerated through the primary injector nozzles or aperatures, and directed to flow into the ejector as illustrated in FIG. 3.

Figure 3:
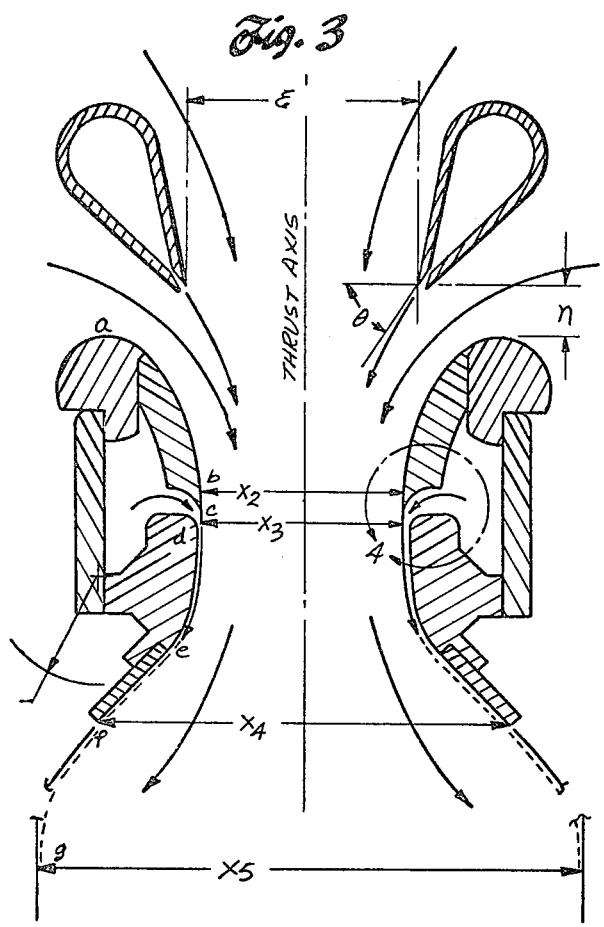
FIG. 3 is a sectional view taken along the line 3—3 of FIG. 2.
Figure 4:
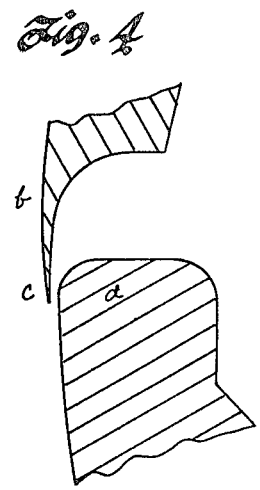
FIG. 4 is an enlarged view of the diffusing jet structure illustrated in FIG. 3.

A feature of this invention is the location of the primary jet nozzle exit at the position $\xi$, $\eta$ with respect to the inlet lip or throat of the ejector and at angle $\theta$ with respect to the normal to the thrust axis, as illustrated in FIG. 3. The throat of an ejector is generally considered to be the section having the smallest cross-sectional area. Tests have confirmed that for maximum thrust augmentation, these parameters, locating the primary nozzle with respect to the ejector inlet, depend upon the pressure, temperature and the other intrinsic properties of the injected and induced fluids, however, under all conditions tested to date, the values of $\xi$, $\eta$ and $\theta$ lie between the following limits.

$$1.5 X_2 > \xi > X_2$$

$$X_2/2 > \eta > X_2/8$$

$$60° > \theta > 20°$$

The tests which provided the above-described results were made with compressed air at pressures up to 3.5 pounds per square inch above ambient and approximately ambient temperature, and it is conceivable that the injection of other liquid or gaseous fluids at any other pressures and temperatures may impose other optimal values to $\xi$, $\eta$ and $\theta$. These parameters indicate that, in direct opposition to the teachings in the aforementioned Coanda Pat. No. 3,261,162, the attachment of the primary nozzles directly to the inlet is far from optimal for maximum augmentation, since in that case only one side of the primary jet can mix with the induced fluid, and the momentum of the side next to the wall is dissipated by skin friction. By providing a gap between the primary nozzle and the inlet lip a flow of induced fluid is permitted to enter between the primary nozzle and the inlet lip. Proper values of $\xi$, $\eta$ and $\theta$ then assure optimal mixing and a reduction in skin friction dissipation wich tends to maximize the thrust augmenting capability of the ejector.

A further feature of this invention is the use of primary jets along the sides of the ejector only. These have been shown to be superior to primary jets which completely circumscribe a rectangular ejector.

INLET SECTION

The inlet section of the ejector shroud (a-b), see FIG. 3, is a converging duct in which the induced fluid is accelerated and mixed with the primary injected fluid. The curvature of the walls of this section must be designed with consideration for the avoidance of:

Sharp inlet edges

Small radius of curvature of the surface

Discontinuities in the surface slope.

The presence of sharp inlet edges produces flow irregularities which persist throughout the ejector and cause regions of reverse flow which can result in a large reduction in the overall thrust of the ejector.

A small radius of curvature, less than $X_2/2$ of the inlet bell produces pressure gradients across the ejector creating regimes of lower static pressure near the wall than at the center of the ejector. This creates unnecessarily large pressure recovery requirements in the diffuser and can result in diffuser separation.

Discontinuities in the slope of the inlet bell surfaces are also to be avoided due to the possibility of creation of flow irregularities.

DIFFUSER

The diffuser of the jet diffuser ejector of the present invention is comprised of three distinct elements, upstream and downstream solid sections and a jet, the solid portions of which must be designed with careful consideration for the avoidance of flow separation while attempting to achieve the largest possible area ratio $X_5/X_2$ (see FIG. 3) with the minimal length in the thrust direction and the jet must be designed to utilize minimal expenditure of momentum and energy from the source of power supply of the system, while providing sufficient momentum to avoid separation in the downstream solid diffuser and to form a jet diffuser as described below.

UPSTREAM SOLID DIFFUSER (b-c)

The portion of the diffuser (b-c), FIG. 3, upstream of the diffuser jet should serve to achieve as large a portion of the diffusion process as is possible without flow separation. The maximum slope of the wall with respect to the axis of symmetry should not exceed approximately 15 degrees for short diffusers and about 6 degrees for long diffusers. This angle should be made as large as possible, consistent with the avoidance of separation, (of the particular fluid being utilized), from the walls or surface of the ejector. Separation upstream of the diffuser jet will prevent the achievement of further diffusion in the portions of the diffuser downstream of this section.

DIFFUSER JET (c-d)

The diffuser jet emanating from a nozzle, incorporated in the solid diffuser surface as illustrated in FIG. 3, serves two distinct purposes.

(a) It acts to prevent separation from the solid wall downstream of the jet (d-e-f), and;

(b) It mixes with the core flow, a mixture of primary and induced fluid flowing through the ejector at the diffusing section, and causes it to diffuse beyond the solid diffuser surface in the jet diffuser (f-g), as illustrated in FIG. 3.

The diffuser jet may be comprised of a fluid having identical physical and thermodynamic properties as those of the primary jet fluid or may be a different fluid having different physical and thermodynamic properties from those of the primary jet. In either case, the use of a diffuser jet having a momentum greater than approximately 15 percent of the momentum of the primary jet results in less than optimal thrust augmentation. Thus for the situation in which the diffuser jet and the primary jet are supplied with identical fluids, i.e., the same thermodynamic and physical properties, it is desirable that the total diffuser jet exit area be approximately 10 percent to 15 percent of that of the primary jet exit area. The influence of skin friction upon the diffuser jet flow may, in some designs, prevent the achievement of this relationship between diffuser and primary jet areas due to the requirement for extremely thin diffuser jet sheets. These thin jet sheets are rapidly dissipated by skin friction and when this occurs the functions of the diffuser jet cannot be accomplished. In this case however it is still desirable to use a jet diffuser with larger than optimal area ratio values of diffuser jet area/primary jet area, if ejector size is important, since the penalty for larger area ratio values of diffuser jet area/primary jet area may be acceptable in view of the size reduction achievable as a result of the reduction in diffuser length for any desired area ratio $(X_5/X_2)$ achievable with a large diffuser angle $(\beta)$, without separation.

DOWNSTREAM SOLID DIFFUSER (d-e-f)

Theory indicates the desirability of large solid diffuser area ratios in addition to a large jet diffuser angle $\beta$ for the achievement of high thrust augmentation.

Since the solid diffuser upstream of the jet has limited area ratio capability, particularly if the divergence angle is large, if separation is to be avoided, it is essential that the solid diffuser downstream of the diffuser jet be designed with as large an area ratio and divergence angle as can be utilized in the application being considered. It has been found necessary to design this portion of the solid diffuser, as illustrated in FIG. 3, to permit mixing of the diffuser jet and core fluids sufficiently to prevent separation between these two flows, and to provide a large angle $\beta$ at the downstream end of the solid diffuser surface, for effective jet diffusion.

The essential features of this portion of the solid diffuser are:

1. A slope at d which is parallel to the ejector's axis of symmetry or which diverges at an angle not to exceed the slope of the wall of the upstream solid diffuser surface at c.

2. A gradual continuous change of slope from d to the point e, where the slope is equal to the desired angle $\beta$.

3. A flat extension which maintains the angle $\beta$ while increasing the area ratio $X_4/X_2$, or the proper choice of the radius of curvature which terminates the solid diffuser surface at the desired angle $\beta$ and the desired area ratio $X_4/X_2$.

THREE DIMENSIONAL EJECTOR END CONFIGURATIONS

The shape of an ejector, looking into its throat in the direction of the thrust vector may have any desired configuration. The cross sections described hereinabove are intended to be representations of a typical transverse plane normal to the longitudinal axis of a rectangular ejector, line 3—3 in FIG. 2.

Figure 1:
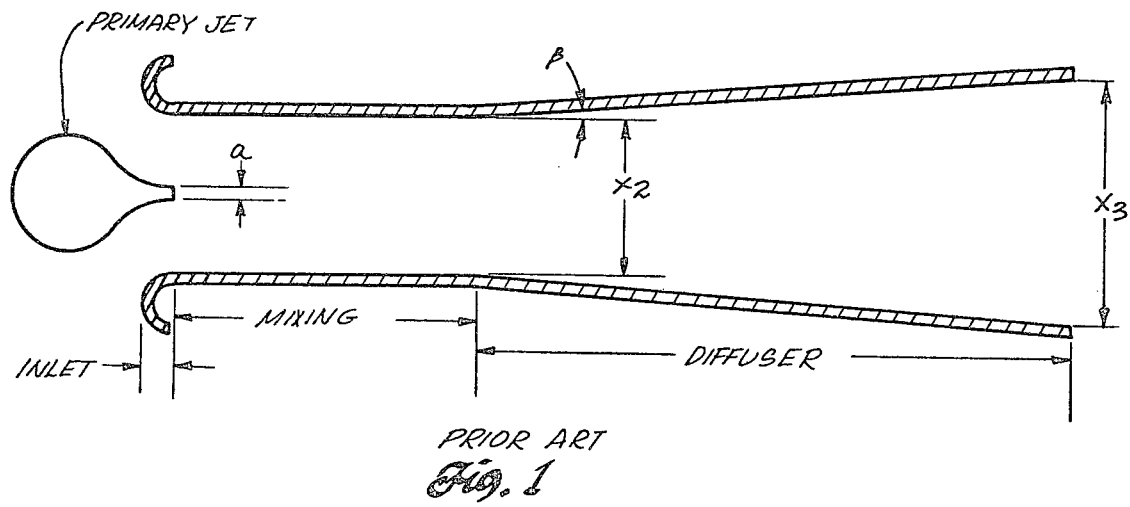
FIG. 1 is a diagrammatic representation of a prior art ejecting structure.
Figure 2:
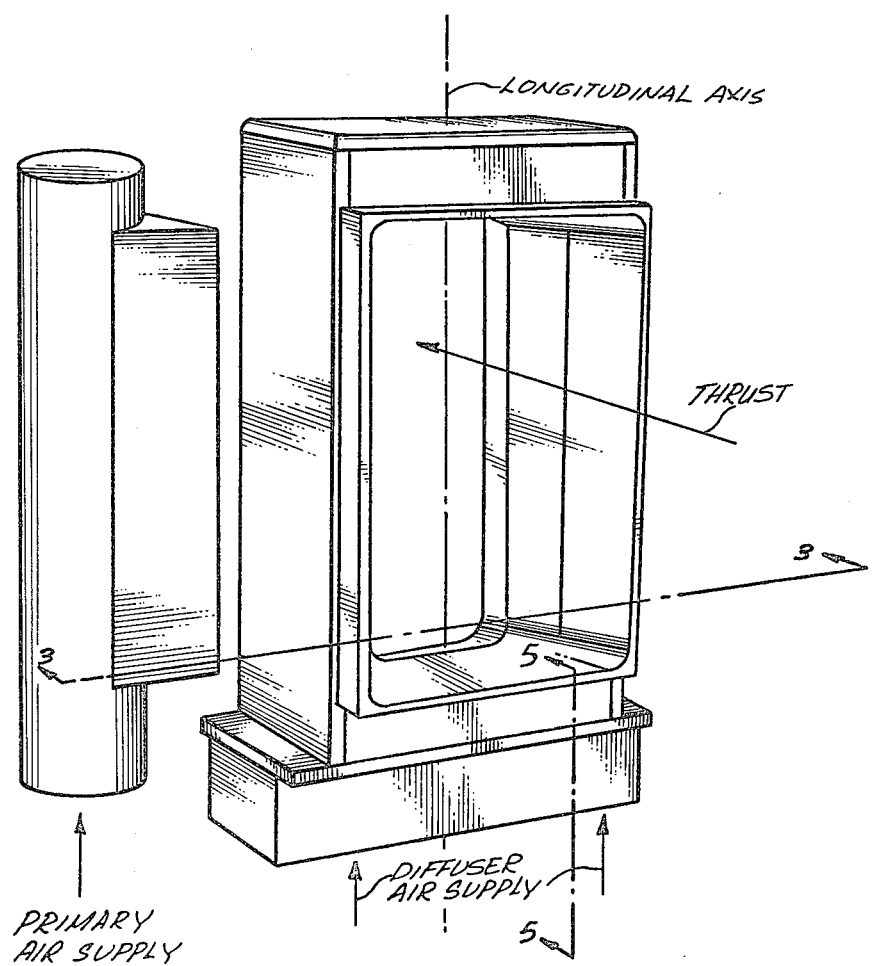
FIG. 2 is a perspective view of the ejecting structure embodying the present invention.

A rectangular ejector as illustrated in FIG. 2 may suffer severe losses in thrust unless the ends are carefully designed.

Figure 5:
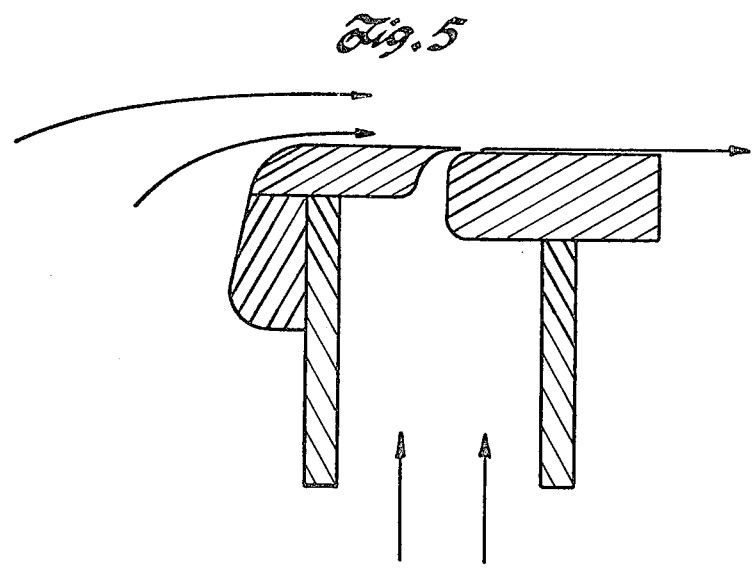
FIG. 5 is a sectional view taken along the line 5—5 of FIG. 2.

Tests performed at the Flight Dynamics Research Corp. of Van Nuys, California, with various end configurations have illustrated the necessity for ejector ends which differ considerably from the shape of the transverse cross-section, for optimal performance. As illustrated in FIG. 5 the inlet and diffuser end sections having the least detrimental effects on the overall performance are essentially flat. The inlet lips are curved to avoid sharp edges as with the sides, but immediately downstream of the lip, the inlet section becomes flat, no divergence, to the diffuser jet slot. Downstream of the diffuser jet slot, the ends of the ejector remain flat ($\beta_{end}=0$), to the end of the downstream solid diffuser for optimal performance.

What is claimed is:

1. An ejector for thrust augmentation including an ejector having a converging inlet section for mixing fluids and a diffusing section downstream from the inlet section for diffusing the mixed fluids, primary injection nozzle means arranged in a preselected spaced relationship with the ejector inlet section of the ejector, and at an acute angular relationship with respect to the normal to the thrust axis of the ejector for directing a flow of pressurized fluid to flow into the ejector and permitting a flow of ambient fluid to be induced into the ejector through the space between the primary nozzle means and the inlet section and through the space between the primary nozzle means to be mixed with fluid injected into the ejector, the acute angle is $\theta$ and falls within the following limits: 60 degrees $>\theta>20$ degrees, the preselected spacing being determined on the basis of the pressure and temperature of the preselected fluids to be mixed, and means for supplying pressurized fluid to the primary injection nozzle means.

2. An ejector for thrust augmentation as defined in claim 1 wherein the nozzle means comprises a pair of nozzles each having said preselected angular relationship with the ejector thrust axis and the nozzle fluid exits, the nozzles being arranged with the preselected spaced relationship on opposite sides of the ejector thrust axis.

3. An ejector for thrust augmentation as defined in claim 2 wherein the ejector is of a rectangular configuration.

4. An ejector for thrust augmentation as defined in claim 2 wherein said preselected spaced relationship of the nozzles is $\eta$ and falls within the limits of: $1.5X_2 > \xi > X_2$ wherein $\xi$ is the separation distance between the primary nozzle means outlets, and $\eta$ is the separation distance between the ejector inlet and the primary nozzle means outlet and $\theta$ is the angle between the primary nozzle means outlet and the normal to the thrust axis, and wherein each of the nozzle means has a spacing with respect to the inlet section of the ejector falling within the limits of:

$$(X_2/2) > \eta > (X_2/8)$$

the preselected spacing being determined on the basis of the pressure and temperature of the preselected fluids to be mixed, and means for supplying pressurized fluid to the primary injection nozzle means.

5. An ejector for thrust augmentation including an ejector having a converging inlet section for mixing fluids and a diffusing section downstream from the inlet section for diffusing the mixed fluids, primary injection nozzle means arranged in a preselected spaced relationship with the ejector inlet section of the ejector, and at an acute angular relationship with respect to the normal to the thrust axis of the ejector for directing a flow of pressurized fluid to flow into the ejector and permitting a flow of ambient fluid to be induced into the ejector through the space between the primary nozzle means and the inlet section and through the space between the primary nozzle means to be mixed with fluid injected into the ejector, said nozzle means comprising a pair of nozzles each having said preselected angular relationship with the ejector thrust axis and the nozzle fluid exits, the nozzles being arranged with the preselected spaced relationship on opposite sides of the ejector thrust axis, the preselected spacing being determined on the basis of the pressure and temperature of the preselected fluids to be mixed, and means for supplying pressurized fluid to the primary injection nozzle means.

6. An ejector for thrust augmentation including an ejector having a converging inlet section and a diffusing section downstream from the inlet section for diffusing the mixed fluids, primary injection nozzle means arranged in a preselected spaced relationship with the ejector inlet section of the ejector and at an acute angular relationship with respect to the thrust axis of the ejector for directing a flow of pressurized fluid to flow into the ejector and permitting a flow of ambient fluid to be induced into the ejector through the space between the primary injection nozzle means and the inlet section and through the space between the primary nozzle means to be mixed with fluid injected into the ejector, and acute angle is $\theta$ and falls within the range of 20 to 60 degrees, the preselected spacing being predetermined on the basis of the pressure and temperature of the injected and induced fluids to be mixed, means for supplying a pressurized fluid at an arbitrary pressure and temperature to the primary injection nozzle means, the diffusing section of the ejector is constructed and defined to comprise solid upstream and downstream diverging sections having a large fluid outlet to fluid inlet area ratio in a relatively small length in the direction of thrust through the provision of a large divergent angle for the solid surfaces, the diffusing section including diffuser jet means arranged intermediate the upstream and downstream diffusing sections for introducing a thin, high speed peripheral jet stream into the diffusing section to prevent separation in the downstream diffusing section between the mixed fluids and the diffuser wall to cause it to diffuse beyond the end of the downstream diffusing section so as to cause it to continue to diverge beyond said end, and means for supplying diffusing fluid to the diffuser jet means.

7. An ejector for thrust augmentation as defined in claim 6 wherein the inlet of the ejector has a throat having the smallest cross-sectional area of the ejector and the preselected spaced relationship of the primary injection nozzle means and the ejector inlet section fall within the range of one-half to one-eighth of the width of the throat section.

8. An ejector for thrust augmentation including an ejector having a converging inlet section for mixing fluids and a diffusing section downstream from the inlet section for diffusing the mixed fluids, primary injection nozzle means arranged in a preselected spaced relationship with the ejector inlet section of the ejector and at an acute angular relationship with respect to the thrust axis of the ejector for directing a flow of pressurized fluid to flow into the ejector and permitting a flow of ambient fluid to be induced into the ejector through the space between the primary injection nozzle means and the inlet section and through the space between the primary injection nozzle means to be mixed with fluid injected into the ejector, said primary injection nozzle means comprising a pair of nozzles having said relationship with the inlet section of the ejector for directing fluid flow into the ejector to allow both sides of the fluid emanating from the primary nozzles to mix with the induced fluid, the preselected spacing being predetermined on the basis of the pressure and temperature of the preselected injected and induced fluids to be mixed, means for supplying a pressurized fluid at an arbitrary pressure and temperature to the primary injection nozzle means, the diffusing section of the ejector is constructed and defined to comprise solid upstream and downstream diverging sections having a large fluid outlet to fluid inlet area ratio in a relatively small length in the direction of thrust through the provision of a large divergent angle for the solid surfaces, the diffusing section including diffuser jet means arranged intermediate the upstream and downstream diffusing sections for introducing a thin, high speed jet stream completely surrounding the periphery of the ejector into the diffusing section to prevent separation in the downstream diffusing section between the mixed fluids and the diffuser wall and to cause it to diffuse beyond the end of the downstream diffusing section, and means for supplying diffusing fluid to the diffuser jet means.

9. An ejector for thrust augmentation as defined in claim 8 wherein the spaced relationship between the primary injection nozzles is related to the throat width of the ejector and falls within the range of being greater than the throat width of the ejector and smaller than one and one-half times said throat section width.

10. An ejector for thrust augmentation as defined in claim 9 wherein the ejector is of a rectangular configuration and the downstream diffusing section is further characterized as having a relatively large angle in excess of 7 to 8 degrees for providing effective jet diffusion.

11. An ejector for thrust augmentation as defined in claim 8 wherein the diffusing section is further characterized as having a relatively large angle in excess of 7 to 8 degrees at the downstream end of the downstream diffusing section.

12. An ejector for thrust augmentation including an ejector having a rectangular configuration and a converging inlet section and a diffusing section downstream from the inlet section for diffusing the fluids, primary injection nozzle means arranged in a preselected spaced relationship with the ejector inlet section of the ejector and at an acute angular relationship with respect to the thrust axis of the ejector for directing a flow of pressurized fluid to flow into the ejector and permitting a flow of ambient fluid to be induced into the ejector through the space between the primary injection nozzle means and the inlet section and through the space between the primary injection nozzle means to be mixed with fluid injected into the ejector, said primary injection nozzle means comprising a pair of injection jets arranged on opposite sides of the longitudinal axis of the ejector in said spaced relationship therewith, the preselected spacing being predetermined on the basis of the pressure and temperature of the preselected injected and induced fluids to be mixed, means for supplying a pressurized fluid at an arbitrary pressure and temperature to the primary injection nozzle means, the diffusing section of the ejector is constructed and defined to comprise solid upstream and downstream diverging sections having a large fluid outlet to fluid inlet area ratio in a relatively small length in the direction of thrust through the provision of a large divergent angle for the solid surfaces, the diffusing section including diffuser jet means arranged intermediate the upstream and downstream diffusing sections for introducing a thin, high speed jet stream completely surrounding the periphery of the ejector into the diffusing section to prevent separation in the downstream diffusing section between the mixed fluids and the diffuser wall and to cause it to diffuse beyond the end of the downstream diffusing section, and means for supplying diffusing fluid to the diffuser jet means.

13. A method for operating an ejector for maximal thrust augmentation wherein the injection means comprises a pair of injection nozzles including the steps of providing an ejecting structure, arranging injection means at a preselected spaced relationship with the sides of the inlet section of the ejecting structure and at a preselected acute angular relationship to the normal to the thrust axis of the ejector, injecting a pressurized fluid into the ejecting structure through the injection means to cause the injected fluid to mix with the ambient fluid induced into the ejecting structure through the spaces between the injection nozzles and the ejecting structure;

providing diffusing jet means for the ejecting structure downstream of the pair of injection nozzles for diffusing the mixed fluids and avoiding separation in the downstream ejecting structure diffusing section, and injecting a diffusing fluid into the diffusing jet means.

14. A method for operating an ejector for maximal thrust augmentation as defined in claim 13 including the step of diffusing the jet stream comprising the induced fluids and primary jet fluid in a relatively short length of the ejecting structure and beyond the ejecting structure.

15. A method for operating an ejector for maximal thrust augmentation as defined in claim 13 including the steps of providing a relatively large angle in excess of 7 to 8 degrees adjacent the outlet end of the ejector and wherein the diffusing jet means injects a thin, high speed, peripheral jet stream into the diffusing section to prevent fluid detachment in the diffusing section and to cause the fluid to diffuse and diverge beyond the large angle end of the diffusing section.

16. An ejector for thrust augmentation including
an ejector having a converging inlet section and a diffusing section downstream from the inlet section for diffusing the mixed core fluids, primary injection nozzle means arranged in a preselected spaced relationship with the ejector inlet section for directing a flow of pressurized fluid to flow into the ejector and permitting a flow of ambient fluid to be induced into the ejector to be mixed with fluid injected into the ejector to thereby provide the mixed core fluids, the diffusing section of the ejector is constructed and defined to comprise a solid upstream diverging section and a solid downstream diverging section having a large fluid outlet to fluid inlet area ratio in a relatively small length in the direction of thrust through the provision of a large divergent angle in excess of 7 to 8 degrees for the solid surfaces, the diffusing section including diffuser jet means arranged intermediate the upstream and downstream diffusing sections for introducing a thin, high speed jet stream, completely surrounding the periphery of the ejector, into the diffusing section along the diffuser solid wall to prevent separation in the downstream diffusing section between the mixed core fluids and the diffuser wall and to prevent separation between the diffuser jet stream and the core fluids and to cause the core fluids to diffuse beyond the end of the downstream diffusing section so as to cause it to continue to diverge beyond said end, and means for supplying a fluid to the primary injection means and the diffuser jet means of the same type of fluid.

17. An ejector for thrust augmentation including an ejector having a converging inlet section and a diffusing section downstream from the inlet section for diffusing the core fluids, primary injection nozzle means arranged in a preselected spaced relationship with the ejector inlet section of the ejector and at an acute angular relationship with respect to the thrust axis of the ejector for directing a flow of pressurized fluid to flow into the ejector and permitting a flow of ambient fluid to be induced into the ejector through the space between the primary nozzle and the inlet section and through the space between the primary nozzle means to be mixed with fluid injected into the ejector to thereby provide the mixed core fluids, the preselected spacing being predetermined on the basis of the pressure and temperature of the preselected injected and induced fluids to be mixed, the diffusing section of the ejector is constructed and defined to comprise a solid upstream diverging section and a solid downstream diverging section having a large fluid outlet to fluid inlet area ratio in a relatively small length in the direction of thrust through the provision of a large divergent angle in excess of 7 to 8 degrees for the solid surfaces, the diffusing section including diffuser jet means arranged intermediate the upstream and downstream diffusing sections for introducing a thin, high speed jet stream completely surrounding the periphery of the ejector and flowing into the diffusing section along the diffuser solid wall to prevent separation in the downstream diffusing section between the mixed core fluids and the diffuser wall and to prevent separation between the diffuser jet stream and the core fluids and to cause the core fluids to diffuse beyond the end of the downstream diffusing section so as to cause it to continue to diverge beyond said end, and means for supplying a fluid to the primary injection means and the diffuser jet means of the same type of fluid.

18. An ejector for thrust augmentation comprising an ejector having a converging inlet section for mixing fluids and a diffusing section downstream from the inlet section, means arranged in a preselected spaced relationship with the ejector inlet section for injecting a primary flow of pressurized fluid to flow into the ejector and permitting a flow of ambient fluid to be induced into the ejector through the space between said means and the inlet section to be mixed with the fluid injected into the ejector to thereby provide the mixed core fluids, the diffusing section comprising an upstream solid diffusing section for receiving the mixed core fluids and a downstream solid diffusing section, diffusing jet means arranged in the diffusing section intermediate the upstream and downstream diffusing sections, the solid diffusing sections being constructed and defined for avoiding flow separation with the wall of the diffusing section while achieving the largest possible area ratio with a minimal length in the thrust direction and with minimal expenditure of momentum and energy of the primary fluid, the diffuser jet injecting a high speed, thin diffuser fluid jet sheet of the same type of fluid as the primary flow into the solid downstream diffusing section for preventing fluid separation of the mixed core fluids from the solid wall of the downstream diffusing section and for mixing with the core flow to cause both the core fluids and mixed jet sheets to diffuse beyond the solid downstream diffusing section to thereby provide said large area ratio on a short solid diffusing section.

19. A method for operating an ejector for maximal thrust augmentation including the steps of providing an ejecting structure, arranging injection means at a preselected spaced relationship with the sides of the inlet section of the ejecting structure and at a preselected acute angular relationship to the normal to the thrust axis of the ejector, injecting a pressurized fluid into the ejecting structure through the injection means to cause the injected fluid to mix with the ambient fluid induced into the ejecting structure through the spaces between the injection means and the ejecting structure, providing a relatively large angle in excess of 7 to 8 degrees adjacent the outlet end of the ejector, providing diffusing jet means for the ejecting structure downstream of the injection means for diffusing the mixed fluids and avoiding separation between the mixed fluids and a diffusing fluid in the downstream ejecting structure diffusing section, the diffusing jet means injects a thin, high speed, jet stream completely surrounding the periphery of the ejector and flowing into the diffusing section to prevent fluid detachment in the diffusing section and to cause the mixed fluids to diffuse and diverge beyond the large end of the diffusing section, and injecting a diffusing fluid into the diffusing jet means.

20. A method for operating an ejector for maximal thrust augmentation as defined in claim 19 wherein the acute angle falls between 20 and 60 degrees.

* * * * *

UNITED STATES PATENT OFFICE
CERTIFICATE OF CORRECTION

Patent No. 4,332,529            Dated June 1, 1982

Inventor(s)  Morton Alperin

It is certified that error appears in the above-identified patent and that said Letters Patent are hereby corrected as shown below:

Column 5, line 24, the symbol "$\eta$" should be --$\xi$--.

Signed and Sealed this

Nineteenth Day of October 1982

[SEAL]

Attest:

GERALD J. MOSSINGHOFF

Attesting Officer

Commissioner of Patents and Trademarks